Sept. 11, 1956

A. J. COTHERN 2,762,155

TROT LINE FISHING LINES

Filed April 20, 1953

Alfred J. Cothern
INVENTOR.

BY
Attorneys

United States Patent Office 2,762,155
Patented Sept. 11, 1956

2,762,155
TROT LINE FISHING LINES

Alfred J. Cothern, Tucumcari, N. Mex.

Application April 20, 1953, Serial No. 349,917

1 Claim. (Cl. 43—27.4)

My invention relates to improvements in trot line fishing lines, and to hook clamp structure for such lines.

The primary object of my invention is to provide a trot line fishing line with leaders and hook clamps arranged so that the line may be extended across a stream, or set, with the leaders and baited hooks held up by the line out of dangling position, and out of the stream while the line is being set-up, and further providing for the hooks and leaders being released at will to fall into the stream by merely pulling the line taut.

Another object is to provide simply constructed hook clamps easily and quickly attachable to the line for holding the baited hooks and leaders to the line above the stream, or for other purposes, and from which the hooks may be easily released by a pull on the leaders and without stripping the bait from the hooks.

Still another object is to provide for accomplishing the above without materially increasing the cost of trot line fishing line equipment.

Other and subordinate objects, within the purview of my invention, together with the precise nature of my improvements will be readily understood when the succeeding description and claim are read with reference to the drawing accompanying and forming part of this specification.

Figure 2:
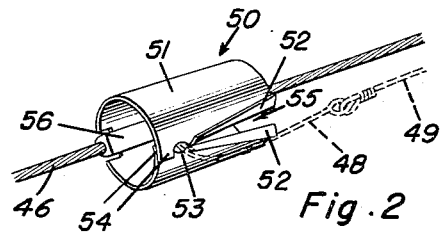
Figure 2 is an enlarged view in perspective of one of the hook clamps.
Figure 3:
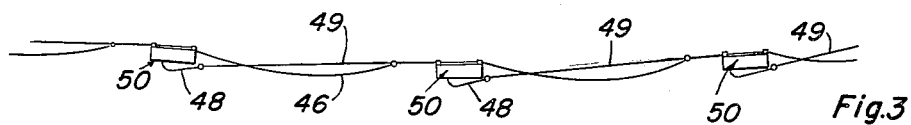
Figure 3 is an enlarged view in side elevation illustrating the manner in which the hooks and leaders are held up by the line for release by pulling the line taut.
Figure 1:
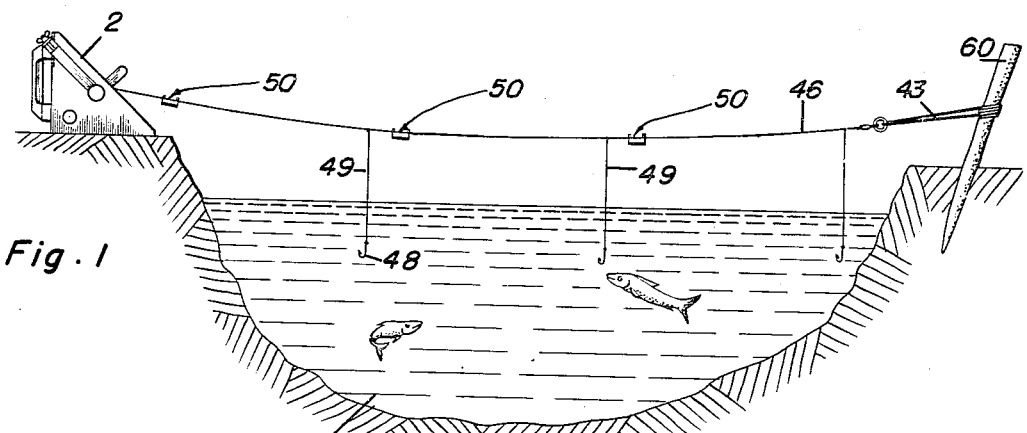
Figure 1 is a view partly in section and partly in side elevation illustrating the manner in which a trot line equipped according to my invention is set up and showing the hooks and leaders released.
Figure 4:
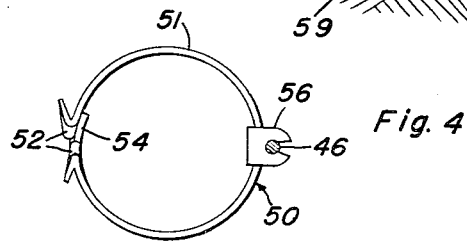
Figure 4 is an enlarged view in end elevation of the hook clamp shown in Figure 2 viewed from the right hand end.

Referring now to the drawing by numerals, according to my invention, a trot line fishing line 46 adapted to be set, as shown in Figure 1, across a stream 59 with one end anchored to the ground at one side of the stream by a cable 43 and stake 60, and its other end anchored to the ground at the other side of the stream by a suitable reel 2 is provided with hook clamps 50 spaced along said line a slightly greater distance from the points of attachment of the leaders 49 to the line than the length of the leaders so that the hooks 48 on the leaders 49 may be clamped in said clamps with the line 46 relieved of tension and the leaders 49 substantially taut, as illustrated in Figure 3.

The hook clamps 50, in the preferred form thereof, each comprise a tubular, longitudinally split, resilient shell 51 with flanged edges 52 at the split 55 converging, relatively, from an open end of the split 55 at one end of said shell to a pair of opposed notches 53 in said edges closed at the other end of said shell by overlapping lips 54 on said edges 52. The converging edges 52 and notches 53 form snap fasteners for the hook 48 extended into the shell 51 by way of the wide end of the split 55 formed by said edges 52. Clips 56 on the ends of the shell 51 spaced circumferentially of the shell from said split 55 provide for fastening said shell to the line 46 at one side of said line so that the hooks 48 may be snapped into the notches 53 when the leaders 49 are substantially taut.

Figure 5:
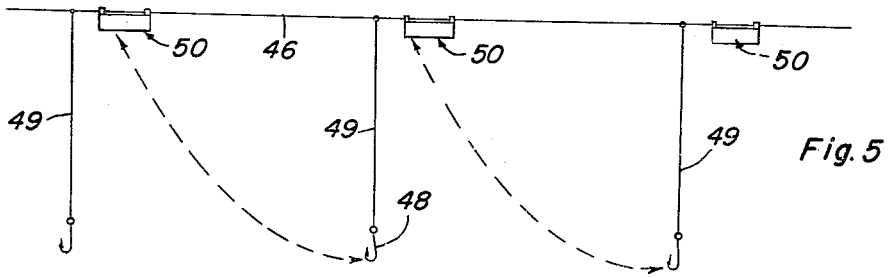
Figure 5 is an enlarged view in side elevation illustrating the hooks and leaders released by pulling the line taut.

In using the invention, the line 46 is set, in the manner described, the hooks 48 baited and inserted in the clamps 50 by way of the open ends of the splits 55 of the hook clamps 50, to be clamped therein in the manner already described. When the line 46 is set, the same is pulled taut, as shown in Figure 5, as by operation of the reel 2, whereupon the hooks will be pulled out of the hook clamps 50 and said hooks and leaders 49 released to drop, as shown in Figure 5, and to fall into the stream as illustrated in Figure 1.

The invention, as described, is susceptible of modification, without departing from the inventive concept, and right is herein reserved to such modifications as fall within the scope of the appended claim.

Having described my invention, what is claimed as new is:

In a fishing line having a leader attached at one end thereto with a hook on its other end, a clamp for the hook comprising a tubular resilient shell having a longitudinal split in the side thereof having an open end at one end of the shell for insertion of a hook into said split, clips on the ends of the shell adapted to fasten said shell to said line at one side thereof and spaced circumferentially of the shell from said split so that the hook may be inserted in said split from the open end of the split to project into said shell, opposite notches in the edges of the split adjacent the other end of the split for releasably retaining the hook in the split, said split tapering from its open end toward said notches to guide a hook toward said notches, and lips on said edges of the split overlapping to close said notches.

References Cited in the file of this patent
UNITED STATES PATENTS

| | | |
|---|---|---|
| 774,462 | Bishop | Nov. 17, 1903 |
| 1,133,542 | Deal | Mar. 30, 1915 |
| 1,236,659 | Bendixen | Aug. 14, 1917 |
| 1,362,781 | Chase | Dec. 21, 1920 |
| 1,365,813 | Brown | Jan. 18, 1921 |
| 1,963,502 | Phillips | June 19, 1934 |
| 2,028,477 | Rupp | Jan. 21, 1936 |
| 2,459,288 | Robbins et al. | Jan. 18, 1949 |
| 2,514,110 | Warren | July 4, 1950 |
| 2,582,090 | Wineinger | Jan. 8, 1952 |
| 2,629,197 | Duvall | Feb. 24, 1953 |
| 2,633,661 | Stevens et al. | Apr. 7, 1953 |
| 2,691,840 | Smith | Oct. 19, 1954 |